(12) United States Patent
Kobayashi

(10) Patent No.: US 6,350,402 B1
(45) Date of Patent: Feb. 26, 2002

(54) VULCANIZING METHOD AND VULCANIZING APPARATUS OF TIRE

(75) Inventor: Michihito Kobayashi, Toyota (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 09/362,864

(22) Filed: Jul. 29, 1999

(30) Foreign Application Priority Data

Aug. 3, 1998 (JP) ............................................. 10-219102

(51) Int. Cl.$^7$ ............................................... B29C 35/02
(52) U.S. Cl. ...................... 264/326; 249/78; 264/327; 264/DIG. 46; 425/41; 425/50; 425/DIG. 13
(58) Field of Search ................................. 264/326, 315, 264/325, 327, 40.6, DIG. 46; 425/40, 41, 50, 143, 144, DIG. 13; 249/78

(56) References Cited

U.S. PATENT DOCUMENTS

| | | |
|---|---|---|
| 2,370,624 A | 3/1945 | Gillespie |
| 2,451,992 A | 10/1948 | Te Grotenhuis |
| 2,618,812 A | * 11/1952 | Hulswit, Jr. et al. ........ 264/326 |
| 4,699,578 A | * 10/1987 | Sumner et al. ............. 264/326 |

FOREIGN PATENT DOCUMENTS

| | | |
|---|---|---|
| EP | 0183450 | 6/1986 |
| EP | 0513348 A1 | 11/1992 |
| FR | 2619337 | 2/1989 |
| JP | 55-74854 | 6/1980 |
| JP | 6-18699 B | 3/1994 |

* cited by examiner

Primary Examiner—Mathieu D. Vargot
(74) Attorney, Agent, or Firm—Birch, Stewart, Kolasch & Birch, LLP

(57) ABSTRACT

A tire T is vulcanized by heating the tire T from both an outer forming surface So of an outer mold 2 for forming an outer surface of the tire T and an inner forming surface Si of an inner mold 3 for forming an inner surface of the tire T. The inner forming surface Si is divided into a plurality of inner forming surface portions Si1, Si1 and Si2 in accordance with portions of the tire T, and the inner mold 3 is provided with heaters 5U, 5L and 5M capable of heating the inner forming surface portions Si1, Si1 and Si2 at different temperatures. Since the tire is vulcanized while varying the heating temperatures from inside of the tire in accordance with the portions of the tire, it is possible to vulcanize each of the portions of the tire under optimal temperature condition without generating uneven temperature between upper and lower portions, and it is possible to enhance the performance of the tire.

6 Claims, 5 Drawing Sheets

VULCANIZING METHOD AND VULCANIZING APPARATUS OF TIRE

BACKGROUND OF THE INVENTION

1. Field of the Invention

The present invention relates to a vulcanizing method and a vulcanizing apparatus of a tire capable of vulcanizing a tire at optimal temperature in accordance with various portions of the tire so as to enhance the performance of the tire.

2. Description of the Prior Art

In general, when a tire is vulcanized, as shown in FIG. 5, a vulcanizing apparatus having an outer mold (*a*) having a tire forming barrel (a1), and a bladder (*b*) for pushing a raw tire (*t*) against an inner peripheral surface of the tire forming barrel (a1) is used. A tire is heated from outside by heat transmitted from heaters (*h*) provided on upper and lower platen plates (*c*) through the outer mold (*a*). The tire is heated from inside by high temperature thermal pressure medium (*e*) charged in the bladder (*b*), and the outside and inside of the tire is controlled to be constant temperature.

On the other hand, characteristics required by various portions of the tire such as a tread portion, a side wall portion, and a bead portion are different. For example, the tread portion requires grip properties, wear resistance, crack resistance, low febriferous properties, and the like, so as to contact the ground to transmit the driving and braking forces. The side wall portion requires flexibility, crack resistance and weather resistance, so as to prevent the carcass from being injured, and so that the side wall portion can flexibly be bent. The bead portion requires rigidity, wear resistance and low febriferous properties so that the tire is fitted and fixed to the rim. Therefore, different compound rubbers are used for different portions of the tire for satisfying these individual requirements, and as the tire is sophisticated and the output becomes higher in recent years, the characteristics of the compound rubbers are enhanced.

In order to allow the individual compound rubbers to exhibit the individual characteristics sufficiently, it is necessary to vulcanize the individual compound rubbers at optimal vulcanizing temperatures.

However, in the conventional vulcanizing apparatus, since the outside and inside of the tire are controlled at constant temperature, it is difficult to sufficiently exploit the performance of the compound rubber, and the tire performance is deteriorated.

Especially in a steam vulcanizing method using saturated steam as the thermal pressure medium, or in a gas vulcanizing method using a thermal pressure medium which is a mixture of steam and inert gas such as nitrogen gas, steam condensed in vulcanization tends to be accumulated at a lower side (s2) as drain (*d*), or low temperature inert gas and high temperature steam tend to be separated upward and downward in the bladder (*b*). As a result, an uneven temperature is generated between an upper side (s1) and a lower side (s2) in the inner surface of the tire (*t*), which promotes the deterioration of the tire performance which prevents optimization of the vulcanization.

In Japanese Patent Publication JP-A-6-18699, it is proposed to change the temperature of the outer mold depending upon a portion of the tire (tread portion and side wall portion) so as to vulcanize the compound rubber at optimal vulcanizing temperature. However, the various portions of the tire are uniformly heated from inside through the bladder by thermal medium in the steam vulcanizing method or in the gas vulcanizing method, and uneven temperature is generated between the upper and lower sides (s1) and (s2) and therefore, it is difficult to sufficiently optimize the vulcanization.

SUMMARY OF THE INVENTION

Accordingly, it is an object of the present invention to provide a vulcanizing method and a vulcanizing apparatus capable of vulcanizing various portions of the tire under optimal temperature conditions without generating uneven temperature between upper and lower portions, and capable of optimally enhancing the tire performance.

To achieve the above objects, according to the vulcanizing method in a first aspect of the present invention, in the vulcanizing method for vulcanizing a tire by heating from an outer forming surface and an inner forming surface of a vulcanizing apparatus comprising an outer mold having the outer forming surface for forming an outer surface of the tire and an inner mold having the inner surface for forming an inner surface of the tire, the inner forming surface of the inner mold is divided into a plurality of inner forming surface portions in accordance with portions of the tire along an outline of a tire meridian cross section, and temperatures of the inner forming surface portions are varied to vulcanize each of the portions of the tire.

According to the vulcanizing method in a second aspect of the invention, the outer forming surface of the outer mold is divided into a plurality of outer forming surface portions in accordance with portions of the tire along the outline of the tire meridian cross section, and temperatures of the outer forming surface portions are varied to vulcanize each of the portions of the tire.

According to a vulcanizing apparatus in a third aspect of the invention, the vulcanizing apparatus of the tire comprises an outer mold having the outer forming surface for forming an outer surface of the tire and an inner mold having the inner surface for forming an inner surface of the tire, wherein the inner forming surface of the inner mold is divided into a plurality of inner forming surface portions in accordance with portions of the tire along the outline of the meridian cross section, and the inner mold is provided with heaters capable of heating the inner forming surface portions at different temperatures.

According to the vulcanizing apparatus in a fourth aspect of the invention, the outer forming surface of the outer mold is divided into a plurality of outer forming surface portions in accordance with portions of the tire along an outline of the tire meridian cross section, and the outer mold is provided with heaters capable of heating the outer forming surface portions at different temperatures.

DETAILED DESCRIPTION OF THE INVENTION

An embodiment of the present invention will be explained in detail together with the drawings below.

Figure 1:
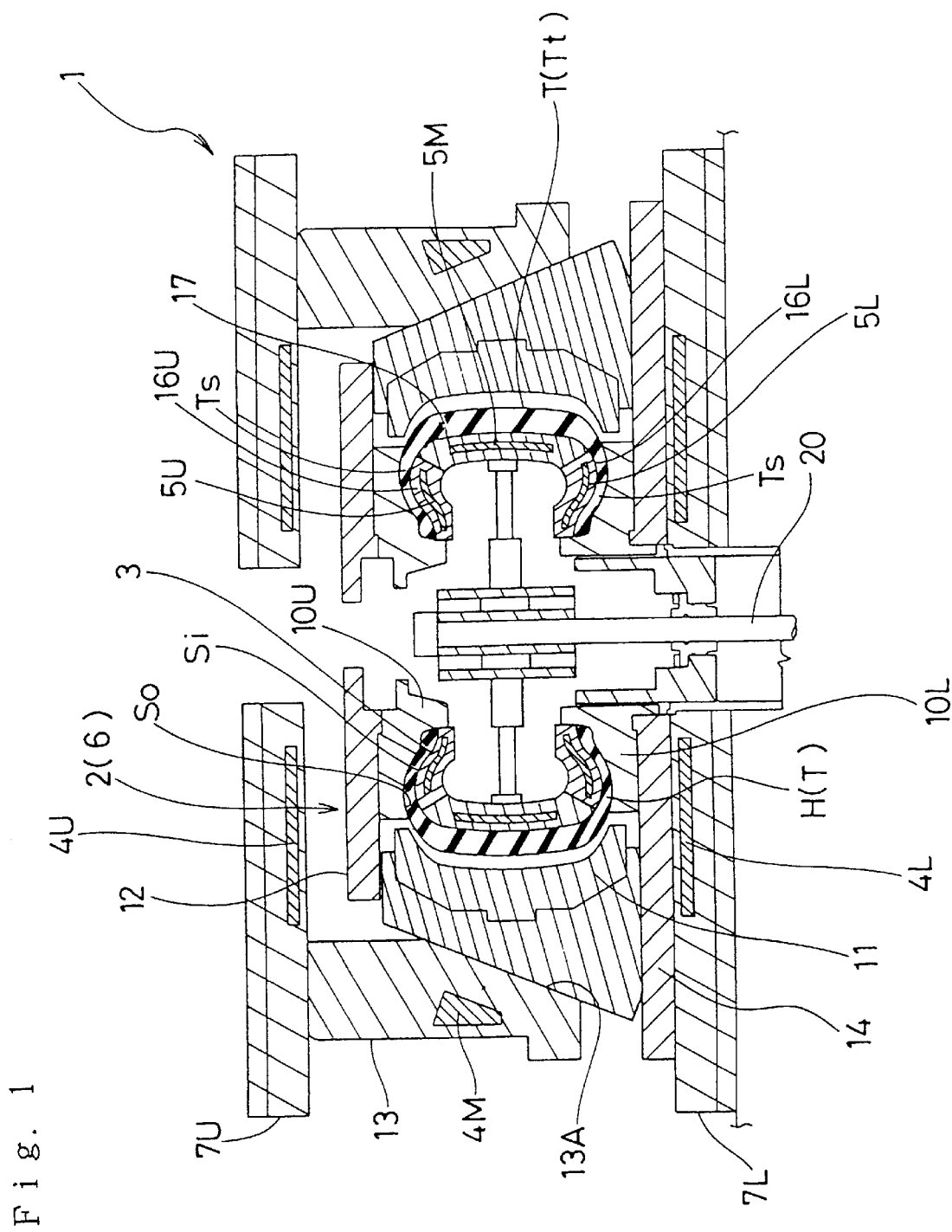
FIG. 1 is a sectional view of a vulcanizing apparatus of an embodiment of the present invention.

FIG. 1 is a sectional view of a vulcanizing apparatus 1 of a tire according to the present invention. In this example, various portions of the tire (shown in FIG. 2) which are side walls Ts and a tread Tt are vulcanized at a temperature in accordance with its compound rubbers.

In the drawings, the vulcanizing apparatus 1 includes an outer mold 2 having an outer forming surface So for forming an outer surface of the tire T, and an inner mold 3 having an inner forming surface Si for forming an inner surface. The tire T is vulcanized and formed in a tire forming barrel H surrounded by the outer forming surface So and the inner forming surface Si.

The outer mold 2 includes an outer mold body 6 constituting the outer forming surface So, and heat plate-like upper and lower platen plates 7U and 7L including heaters for supporting the outer mold body 6. The lower platen plate 7L is fixed to a table (not shown), and the upper platen plate 7U is vertically movably mounted to a press (not shown).

In this example, the outer mold body 6 is of a type which is divided into a plurality of portions in its circumferential direction, and comprises upper and lower side molds 10U and 10L for forming the outer surface of the side walls Ts, and a plurality of segments 11 which are divided in the circumferential direction for forming an outer surface of the tread Tt. Each of the divided surfaces of the upper and lower side molds 10U, 10L and the segments 11 abut against one another, thereby forming a continuous outer forming surface So.

Figure 2:
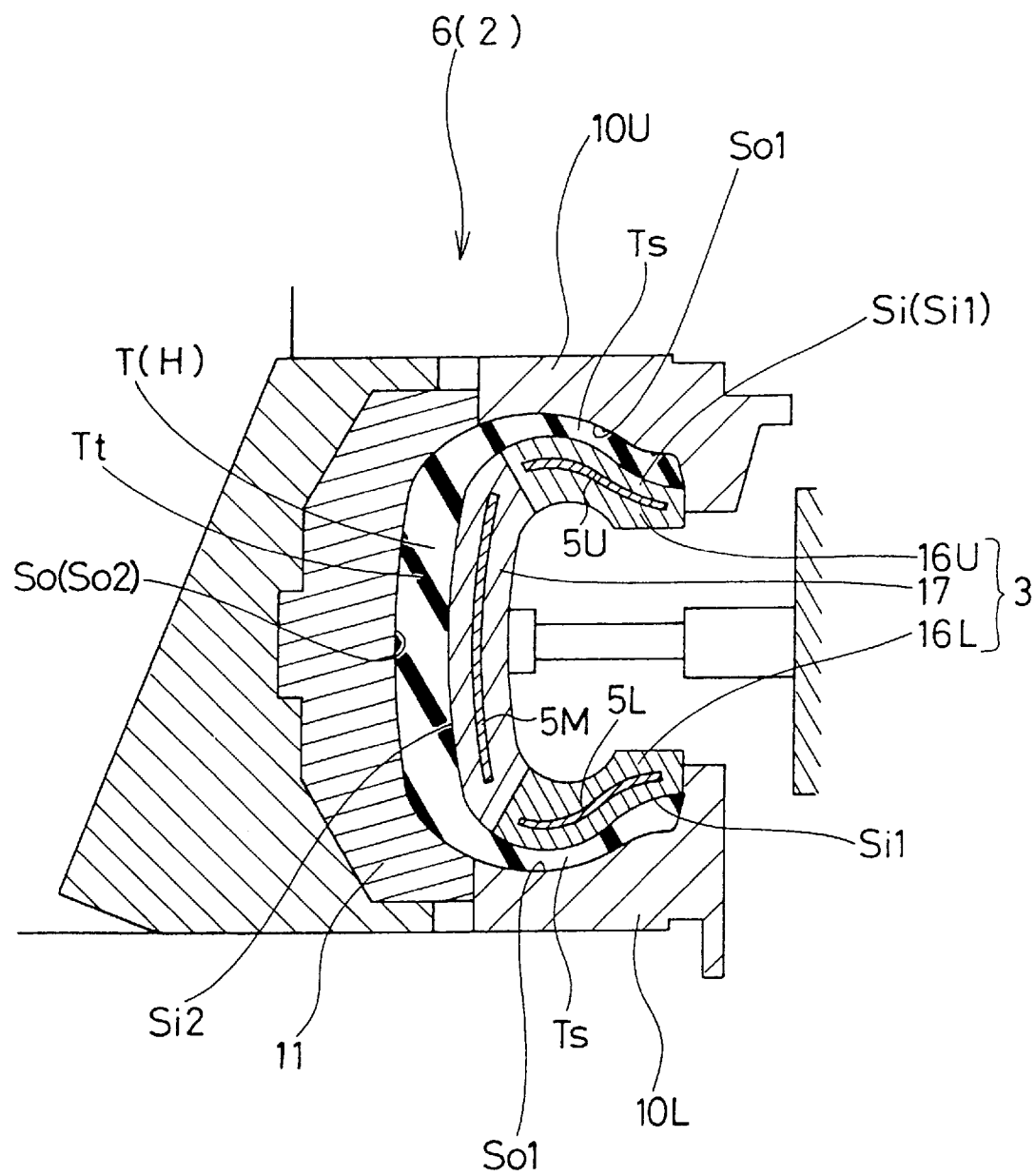
FIG. 2 is a sectional view showing a state during vulcanizing forming of a tire.

That is, as shown in FIG. 2, the outer mold body 6 divides the outer forming surface So into outer forming surface portions So1, So1 comprising the side molds 10U, 10L corresponding to the side walls Ts of the tire, and an outer forming surface portion So2 comprising the segments 11 corresponding to the tread Tt. Therefore, the outer forming surface So is divided along the outline of the tire meridian cross section into a plurality of outer forming surface portions in accordance with the portions of the tire.

The segments 11 are slidably held by an inclined linear bearing 13A of an actuator 13 fixed to the upper platen plate 7U. The upper side mold 10U is mounted to a lower surface of a disc-like holding plate 12 placed between upper ends of the segments 11 such as to be astride the upper ends, and the lower side mold 10L is fixed to the lower platen plate 7L through a holding plate 14.

Figure 3:
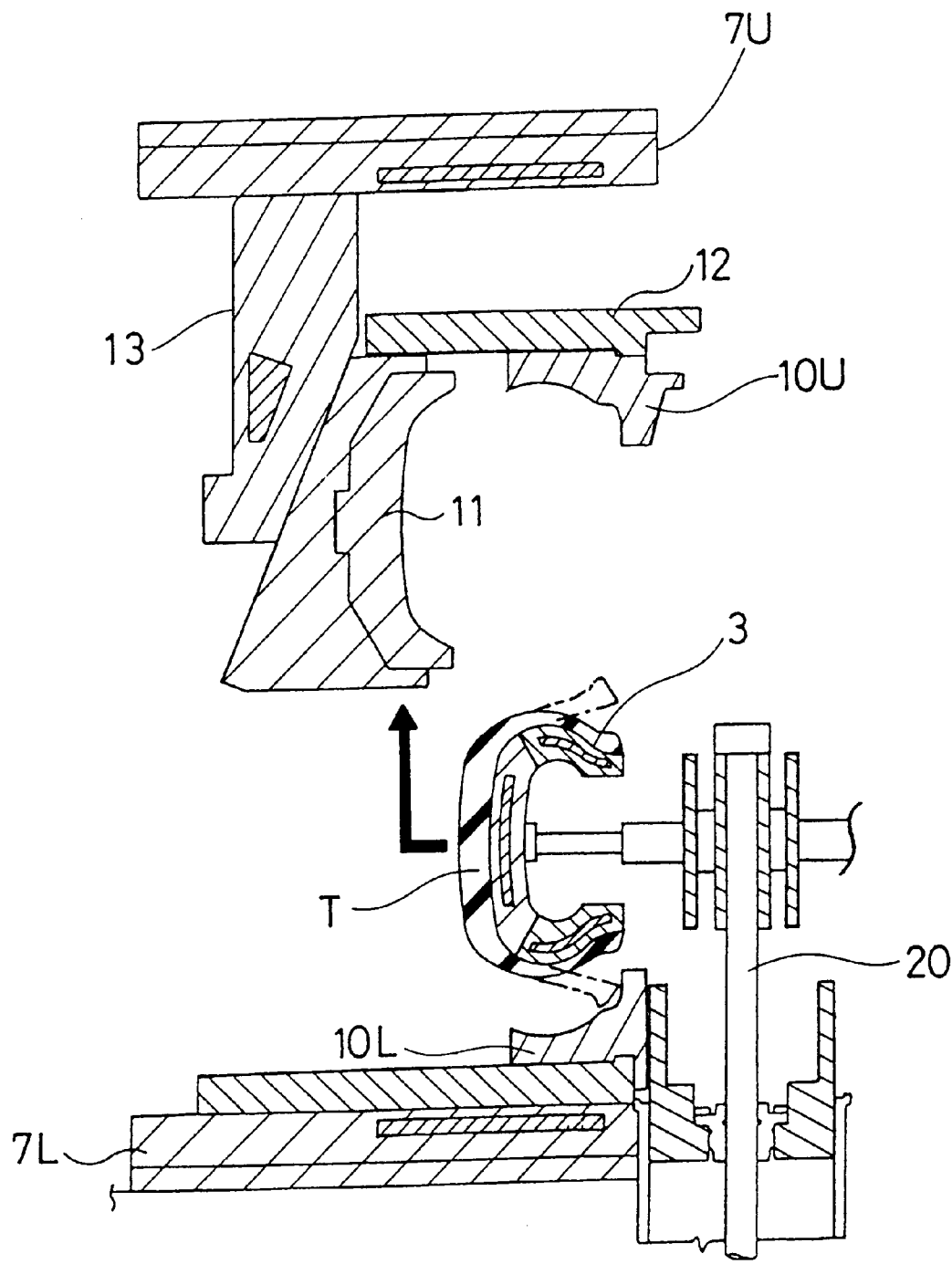
FIG. 3 is a sectional view for explaining a standby state of the vulcanizing apparatus in which an upper platen plate rises.
Figure 4:
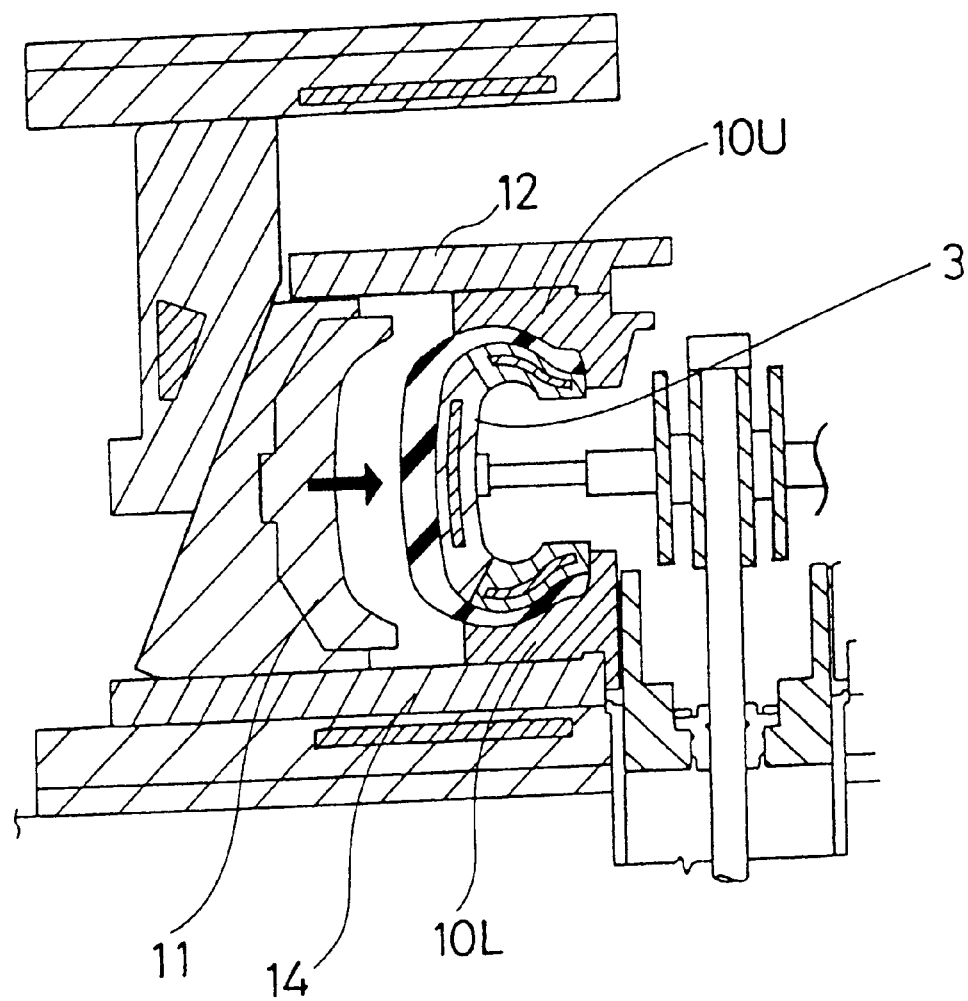
FIG. 4 is a sectional view for explaining motions of side molds and segments when the upper platen plate is lowered.

Therefore, as shown in FIGS. 3 and 4, as the upper platen plate 7U is moved upward by the press, the segments 11 are once increased in diameter so as to separate from the tire T in a radially outer direction of the tire and then, are moved upward together with the upper side mold 10U which is placed on the upper ends of the segments 11. When the segments 11 and the upper side mold 10U are moved upward in this manner, the tire T is mounted and the vulcanized tire is removed. In a closed state of the tire forming barrel H in the lowering motion, the outer mold body 6 closely abuts against the platen plates 7U, 7L through the holding plates 12, 14 and the actuator 13.

The platen plates 7U, 7L and the actuator 13 are provided with heaters 4U, 4L, 4M comprising electric heaters or steam jackets. Therefore, the outer forming surface portions So1, So1 are heated by the heaters 4U, 4L, and the outer forming surface So2 is heated by the heater 4M.

Next, in this example as shown in FIG. 2, the inner mold 3 is a toroid shaped metal rigid body provided with inner mold pieces 16U, 16L corresponding to the side walls Ts, and a central inner mold piece 17 corresponding to the tread Tt and integrally connected to the inner mold pieces 16U, 16L. The inner forming surface Si is formed by an outer surface of the inner mold 3. Therefore, the inner forming surface Si of the inner mold 3 is also divided into a plurality of inner forming surface portions in accordance with portions of the tire along the outline of the tire meridian cross section, i.e., divided into inner forming surface portions Si1, Si1 comprising the inner mold pieces 16U, 16L corresponding to the side walls Ts, and an inner forming surface portion Si2 comprising the central inner mold piece 17.

In this example, the inner mold pieces 16U, 16L, 17 are provided with electric heaters 5U, 5L, 5M, and the inner forming surface portions Si1, Si1 and Si2 are individually heated.

The inner mold 3 is vertically movably supported by a supporting shaft 20 extending concentrically with the tire axis. As shown in FIG. 3, the supporting shaft 20 is moved upward in an upper standby position of the platen plate 7U, the raw tire T is mounted around an outer periphery of the inner mold 3, and the inner mold 3 is lowered to a normal vulcanizing and forming position. In the outer mold 2, as the platen plate 7U is lowered, as shown in FIG. 4, a state in which the tire T is held between the side molds 10U, 10L is once established and then, the segments 11 are moved such as to reduce the diameter thereof in the radially inward direction of the tire while sliding between the holding plates 12, 14.

At the lowering movement completed position of the platen plate 7U, as shown in FIG. 2, divided surfaces of the side molds 10U, 10L and the segments 11 abut against each other, the tire T in the closed tire forming barrel H is clamped and compressed, thereby carrying out the vulcanizing and forming.

Here, the vulcanizing apparatus 1 and the vulcanizing method of the present application are characterized in that the temperatures of the inner forming surfaces portions Si1, Si2 of the inner mold 3 are varied from one another by controlling at least the heaters 5U, 5L and 5M, and various portions of the tire, i.e., the side walls Ts and the treat Tt are vulcanized at different vulcanizing temperatures.

That is, in the present application, vulcanizing temperature at which the characteristics of compound rubber used in each of the portions of the tire can be exhibited most effectively is selected, and the temperature of each of the portions is controlled by the inner forming surface portions Si1, Si2. Since the present application makes it possible to control the temperature from inside of the tire which used to generate the uneven temperatures between upper and lower portions in the conventional technique, it is possible to vulcanize each of the compound rubbers at more suitable temperature as compared with a technique in which the temperature is controlled from outside the tire.

More preferably, the temperatures of the outer forming surface portions So1, So2 are also varied from one another by controlling the heaters 4U, 4L and 4M, and the tire is heated from both inside and outside the tire at temperatures suitable for each of the compound rubbers.

According to the present application, it is possible not only to optimize the vulcanization in accordance with kinds of the compound rubbers, but also to prevent excessive or insufficient vulcanization based on variation in thickness of the rubber. More specifically, the vulcanizing time of a tire is usually set such that the tread Tt which has the greatest tire thickness is not insufficiently vulcanized. Therefore, the side walls Ts which largely contributes to the performance of the tire such as rolling resistance have thinnest thickness and thus are excessively vulcanized, and their characteristics are not exhibited. Therefore, by reducing the temperatures of the inner and outer forming surface portions Si1, So1 corresponding to the side walls Ts lower than the temperatures of the inner and outer forming surface portions Si2, So2 corresponding to the tread Tt, it is possible to suppress the excessive vulcanization, and to allow the required tire performance to be exhibited to the utmost.

As the heaters 4 and 5, it is possible to employ various heaters such as electric heater and the steam jacket as described above, and various temperature controlling methods can be used in accordance with the kind of the employed heater.

It is preferable that heat insulators are interposed between the inner mold pieces 16U, 16L and 17 for keeping the temperature difference between the inner forming surface portions Si1 and Si2.

Although the tread Tt and the side walls Ts are indicated as portions of the tire in this example, a bead can also be added, and the tire may be divided appropriately in accordance with the kinds of the compound rubbers to be used or the thickness of the rubber.

(Embodiment)

In a tire (size of 205/60R15) using side wall compound attaching greater importance to superiority of fuel efficiency (rolling resistance), using the vulcanizing apparatus shown in FIG. 1, the heaters 4U, 4L, 4M of the outer mold 2 and the heaters 5U, 5L, 5M of the inner mold 3 were controlled at different temperature based on the specification shown in Table 1, thereby vulcanizing and forming, and the fuel efficiency of the finished tire was measured. The temperature of the tire at its side which was in contact with each of the forming surface portions (a surface portion corresponding to a forming surface portion in a comparative example) during vulcanizing was measured, and its results are shown in Table 1.

Figure 5:
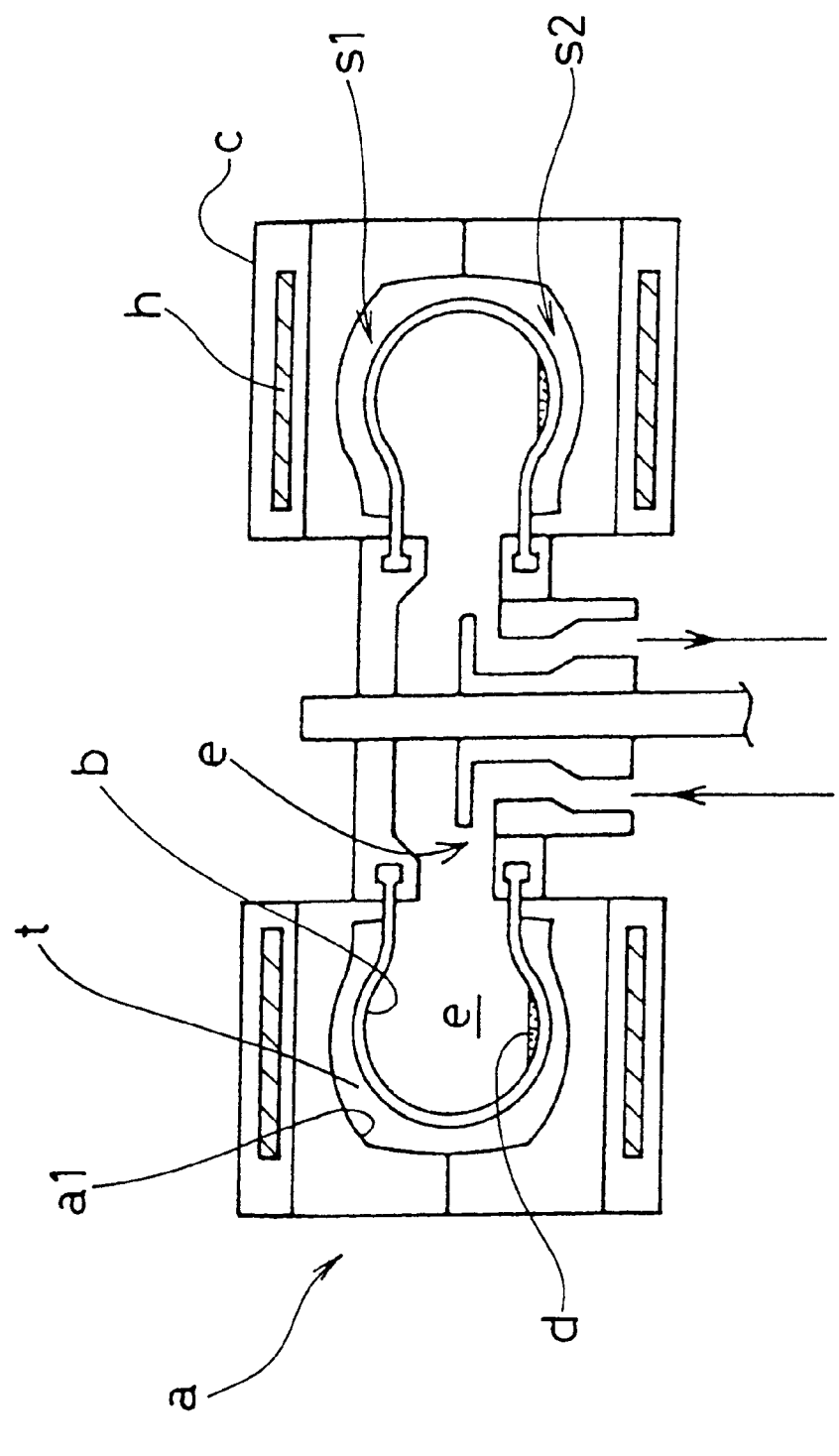
FIG. 5 is a schematic view for explaining a conventional tire vulcanizing method and apparatus.

Further, as the comparative example, a tire was vulcanized and formed by a conventional steam vulcanizing method shown in FIG. 5 in which steam of 14 kgf/cm$^2$ was charged into the bladder in a pushing and cutting state, the fuel efficiency of the finished tire was measured and compared with the embodiment. In the comparative example, the temperature was controlled from outside the tire as in the same manner as that of the present embodiment by heaters 4U, 4L and 4M.

Each of tires were mounted to standard rims, the rolling resistance was measured at standard internal pressure at 80 km/hr at load of 400 kgf using a rolling resistance testing machine, and the fuel efficiency was indicated with index while determining the comparative tire as 100. The fuel efficiency is superior as the index is smaller.

TABLE 1

|  | Example | Comparative Example |
|---|---|---|
| Heaters of outer mold Set temperature (° C.) |  |  |
| 4U | 165 | 165 |
| 4L | 165 | 165 |
| 4M | 180 | 180 |
| Heaters of inner mold Set temperature (° C.)* |  |  |
| 5U | 165 | 185 |
| 5L | 165 | 175 |
| 5M | 180 | 180 |

TABLE 1-continued

|  | Example | Comparative Example |
|---|---|---|
| Temperature (° C.) of tire at the side of outer forming surface portion |  |  |
| Si1 (Up) | 160 | 160 |
| Si1 (Down) | 160 | 160 |
| Si2 | 170 | 170 |
| Temperature (° C.) of tire at the side of inner forming surface portion |  |  |
| Si1 (Up) | 165 | 185 |
| Si1 (Down) | 165 | 175 |
| Si2 | 180 | 180 |
| Vulcanizing time (minutes) | 13 | 13 |
| Fuel efficiency (index) | 96 | 100 |

*Steam temperature in steam vulcanizing method in the case of the comparative example As shown in Table 1, it can be confirmed that in the present embodiment, since the vulcanizing temperature at the side walls Ts is suppressed, the excessive vulcanization is prevented, and the fuel efficiency is enhanced.

As described above, according to the present invention, since the heating temperatures are varied from inside of a tire in accordance with portions of the tire using an inner mold which forms an inner surface of the tire, it is possible to vulcanize each of the portions of the tire under optimal temperature condition without generating uneven temperature between upper and lower portions, and it is possible to enhance the performance of the tire.

What is claimed is:

1. A vulcanizing method for vulcanizing a tire by heating from an outer forming surface and an inner forming surface of a vulcanizing apparatus comprising an outer mold having said outer forming surface for forming an outer surface of said tire and an inner mold having said inner surface for forming an inner surface of said tire, wherein said inner mold is divided into a plurality of inner mold pieces (16U, 16L, 17) made of a metal material, so that said inner forming surface of said inner mold is divided into a plurality of inner forming surface portions in accordance with portions of said tire along an outline of a tire meridian cross section, and temperatures of said inner forming surface portions are varied to vulcanize each of said portions of said tire.

2. A vulcanizing method of a tire according to claim 1, wherein said outer forming surface of said outer mold is divided into a plurality of outer forming surface portions in accordance with portions of said tire along said outline of said tire meridian cross section, and temperatures of said outer forming surface portions are varied to vulcanize each of said portions of said tire.

3. A vulcanizing apparatus of a tire comprising an outer mold having said outer forming surface for forming an outer surface of said tire and an inner mold having said inner surface for forming an inner surface of said tire, wherein said inner mold is divided into a plurality of inner mold pieces (16U, 16L, 17) made of a metal material, so that said inner forming surface of said inner mold is divided into a plurality of inner forming surface portions in accordance with portions of said tire along an outline of a tire meridian cross section, and each of said inner mold pieces (16U, 16L, 17) is provided with heater capable of heating said inner forming surface portion at different temperatures to each other.

4. A vulcanizing apparatus of a tire according to claim 3, wherein said outer forming surface of said outer mold is divided into a plurality of outer forming surface portions in accordance with portions of said tire along an outline of a tire meridian cross section, and said outer mold is provided with heaters capable of heating said outer forming surface portions at different temperatures.

5. A vulcanizing method of a tire according to claim 1, wherein heat insulators are interposed between said inner mold pieces (16U, 16L, 17) for keeping the temperature difference between the inner forming surface portions.

6. A vulcanizing apparatus of a tire according to claim 3, wherein heat insulators are interposed between said inner mold pieces (16U, 16L, 17) for keeping the temperature difference between the inner forming surface portions.

* * * * *